No. 750,626. PATENTED JAN. 26, 1904.
A. H. ENGELJOHN & S. WEALE.
NECK YOKE.
APPLICATION FILED NOV. 12, 1903.
NO MODEL.
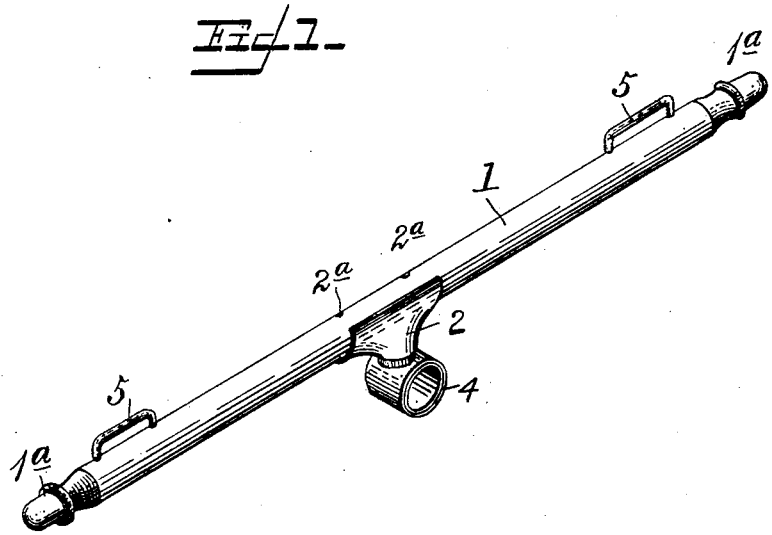
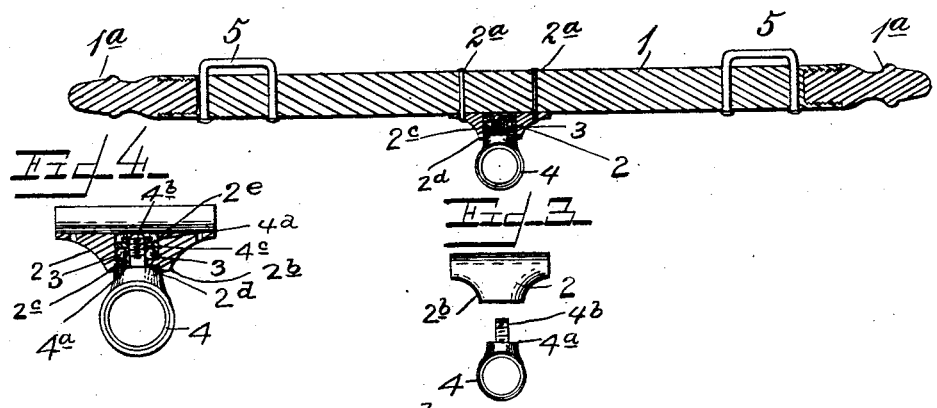
Witnesses:
Inventors:
August H. Engeljohn
and Samuel Weale,
by Louis Bagger & Co.
Attorneys.

No. 750,626. Patented January 26, 1904.

UNITED STATES PATENT OFFICE.

AUGUST H. ENGELJOHN AND SAMUEL WEALE, OF FARINA, ILLINOIS.

NECK-YOKE.

SPECIFICATION forming part of Letters Patent No. 750,626, dated January 26, 1904.

Application filed November 12, 1903. Serial No. 180,947. (No model.)

*To all whom it may concern:*

Be it known that we, AUGUST H. ENGELJOHN and SAMUEL WEALE, citizens of the United States, residing at Farina, in the county of Fayette and State of Illinois, have invented new and useful Improvements in Neck-Yokes, of which the following is a specification.

Our invention relates to improvements in breast-yokes applicable to the poles of vehicles.

It has for its object, in addition to promoting strength and durability, to provide for readily conforming to the movement and position of the team, to lessen friction, consequently wear and tear, and to prevent the premature or undue wear of the pole-straps.

Said invention consists of the detailed construction and combination of parts, substantially as hereinafter more fully disclosed, and particularly pointed out by the claims concluding the following specification.

In the accompanying drawings, illustrating the preferred embodiment of our invention, Figure 1 is a perspective view thereof. Fig. 2 is a central transverse section of the same. Fig. 3 is a view of the respective or constituent parts or members of the invention disassembled. Fig. 4 is an enlarged detailed sectional view of the housing member and attached pole carrier or ring. Fig. 5 is a similar view of the same parts at right angles to the plane of the last-referred-to section.

In the embodiment of our invention we preferably provide the principal or bar member 1 of the yoke with acorn or other ornamentally shaped terminals $1^a$, applied thereto by means of screw-threaded stud-and-socket connections, as shown. To said bar or principal member 1, about centrally thereof, is also secured, preferably by rivets $2^a$, a bolster-like member 2, it being adapted upon its surface presented or placed next to said bar to properly embrace the same. Said bolster 2 has a circular elongation or extension $2^b$, having an inner corresponding recess $2^c$, the purpose of which will appear presently, and communicating with said recess is a contracted passage or hole $2^d$, leading to a circular chamber $2^e$, formed in said bolster to contain a series or ring of ball or spherical bearings 3, adapted to roll in contact with each other.

A pole-receiving ring or carrier 4, preferably lined with leather or otherwise, as shown, to encompass the pole, has projecting or extending from a shoulder $4^a$ thereon an end-threaded projection or pivot $4^b$ passing through the hole or passage $2^d$, said shoulder entering the recess $2^c$ of the bolster 2, and upon said pivot or projection is inserted a plate or washer $4^c$, held upon said ball-bearing 3 by a nut $4^d$ engaging the threaded end of said pivot. Thus it will be noted that a pivotal connection is effected between said ring and the principal member or bar 1 of the yoke to which the "pole-straps" (not shown) are connected, being passed through keepers or loops 5 upon said bar, whereby said pole and yoke are adapted to axially swing or adjust themselves to the differential movements of said parts as affected by the action of the team, thereby readily accommodating the movements and positions of the latter. Also it is further noted that friction is reduced to the minimum, the parts permitted to move with greater freedom or celerity, wear and tear lessened, and the premature or undue wearing out of the pole-straps prevented.

It will be understood that we do not limit ourselves to details herein, as they may be changed as circumstances suggest without departing from the spirit of our invention and said invention still be protected.

Having thus described our invention, what we claim as new, and desire to secure by Letters Patent, is—

1. A breast-yoke for vehicle-poles comprising a bar member, a bolster member and a pole-carrying member having a pivot entering said bolster member, said bolster member containing a ring of ball-bearings for said pivot.

2. A breast-yoke for vehicle-poles comprising a bar member, a bolster member having a circular extension provided with a corresponding recess, a chamber and a passage connecting the latter two, said chamber containing a ring of ball-bearings, and a pole-carrying member having a pivot extension passing through said passage and having a shoulder entering said recess and a washer resting upon said ball-bearings and suitably held upon said pivot extension.

In testimony whereof we have signed our names to this specification in the presence of two subscribing witnesses.

AUGUST H. ENGELJOHN.
SAMUEL WEALE.

Witnesses:
S. H. LASWELL,
C. W. CHASE.